United States Patent Office 2,813,088
Patented Nov. 12, 1957

2,813,088

PROCESS FOR MAKING POLYMERIC NITROGEN-CONTAINING DERIVATIVES OF ACRYLAMIDE OR ACRYLAMIDE AND ACRYLONITRILE IN A STRONGLY ACID AQUEOUS MEDIUM

Karl Meinel, Burghausen, Germany, assignor to Wacker-Chemie G. m. b. H., Munich, Germany, a firm of Germany No Drawing. Application September 14, 1955,
Serial No. 534,381

Claims priority, application Germany September 22, 1954

8 Claims. (Cl. 260—85.5)

This invention relates, generally, to methods for producing polymeric nitrogen-containing derivatives of $\alpha$-$\beta$-unsaturated aliphatic carboxylic acids and, more particularly, it is concerned with certain novel and useful hydrophobic polymers of this type and with processes for obtaining them.

It is known that monomeric forms of certain nitrogen-containing $\alpha$-$\beta$-unsaturated aliphatic acid derivatives, notably acrylamide and acrylonitrile, under certain now well-defined conditions, can be polymerized to yield useful homopolymers and copolymers. Commonly, these polymerizations are conducted in emulsions or suspensions of the selected monomer wherein the dispersing phase is an aqueous liquid, usually near neutrality (pH=7.0), and the initiating reaction is provided by redox systems like, for example, a ferrous salt and hydrogen peroxide or an equivalent oxygen-rich reagent such as benzoyl peroxide, an alkyl peroxide, ammonium persulfate or the like. The polymerization reactions are exothermic and the polymeric products, after the reactions have proceeded to the desired degree toward completion, are recovered from the aqueous reaction mixture. Polymerization of acrylamide and copolymerization of acrylamide and acrylonitrile, under these conditions, yield water-soluble polymers which have been found useful in various industrial applications, for instance, in the sizing of fibrous webs.

In certain industrial applications of synthetic polymers, a need has been felt for new polymeric substances, possessed of many of the characteristic properties of these nitrogen-containing polymers but not possessed of their hydrophilic properties.

One of the objects of this invention is to fill this industrial need and to provide certain novel and useful hydrophobic polymers of nitrogen-containing derivatives of $\alpha$-$\beta$-unsaturated aliphatic carboxylic acids, especially of acrylamide and acrylonitrile.

Another object of this invention is to provide a method for effecting modification, as desired, of the hydrophobic properties of polymers of the type aforesaid, through predetermined and controlled adjustment of the environmental conditions when producing the polymers, whereby, at choice, water-insoluble products or products having appreciable water solubility may be obtained.

A further object of this invention is to provide a novel process for making polymers of the type aforesaid wherein the controlled modification of the properties of the products is effected by simple procedural operations that are easily subject to precise control.

Other objects of this invention will be apparent hereinafter.

In accordance with certain aspects, broadly viewed, of this invention, novel and useful hydrophobic polymers are obtained by polymerizing, in an aqueous medium in the presence of a suitable polymerization-initiating redox system, certain nitrogen-containing derivatives of acrylic acid type compounds, under controlled conditions of temperature and acid concentration in the reaction mixture. In this instance, the reaction temperature and the concentration of acid in the reaction mixture are interrelated parameters; comparable products are obtainable by operating at very high acid concentrations and at somewhat lower temperatures, or at lower acid concentrations and somewhat higher temperatures. High temperatures approximating the boiling point of the reaction mixture, say about 100° C., and strongly acid reaction media favor the formation of strongly hydrophobic, water-insoluble polymers that have little tendency to absorb water; operations conducted at lower temperatures, say about 60° C., and in merely weakly acidic media result in formation of polymers that readily absorb and are apprecibaly soluble in water. Polymers having satisfactory water-insolubility and water-absorption characteristics are obtainable by operating at reaction temperatures within the range of about 80° C., as the minimum, and the boiling point of the reaction mixture, as the maximum temperature.

Certain of the terms above employed are used in the following special significance, not inconsistent with their ordinary and usual meaning: By the expression nitrogen-containing derivatives of acrylic acid type compounds is meant such derivatives as the acid amides and nitriles of acrylic acid, methacrylic acid and similar simple, low monomolecular weight $\alpha$-$\beta$-unsaturated aliphatic carboxylic acids; the term polymerization-initiating redox system signifies the combination of a salt of a metal of the third to eighth groups of the periodic system capable of furnishing ions of said metal in a state of less than maximum valency, such as ferrous sulfate, with an oxygen-rich reagent such as a peroxide or a persulfate, especially ammonium persulfate; and the term aqueous medium, when used in reference to the reaction medium, signifies a medium preferably containing a preponderant proportion, i. e., at least 50% by weight, but at most about 70% by weight of water. It will be understood that the water content of the reaction medium is dependent, in part, upon the operating temperatures, and, also, in part upon the type and concentration of acidifying agent used.

The function of the acidifying agent in the reaction is not clearly understood at present and, hence, cannot be defined with precision in terms of theoretical, as distinguished from practical, concepts. It appears that the formation of the desired type of hydrophobic polymers is not merely a function of the hydrogen-ion concentration of the reaction medium, as use of dilute hydrochloric acid, for example, which is highly ionized, yields products having unacceptably high water absorption characteristics. Generally stated, the hydrophobic polymers according to this invention are obtainable by use of reaction media containing, inter alia, high concentrations of a common mineral acid, such as sulfuric, hydrochloric, nitric, perchloric or phosphoric acid, or a strong organic acid, such as toluene sulfonic acid, or a strongly acidic complex of organic or inorganic acids and inorganic salts, such as a mixture of zinc chloride and hydrochloric acid. Experience indicates that when the operations are conducted at a temperature of about 100° C., the desired type of products are obtainable using sulfuric acid in concentrations of about 15% to about 45% or more; phosphoric acid, nitric acid or hydrochloric acid, in concentrations ranging upward from about 10%; perchloric acid in concentrations of about 10% upward to about 30%; and toluene sulfonic acid in concentrations of at least about 15%, all being based on weight. It will be recognized that the concentration of acidifying agent to be employed will be dependent, in part, upon the operating temperature to be used, as lower concentrations of such agent yield products at high temperatures comparable to the products obtainable at lower temperatures using higher concentrations of the agent, as pointed out above.

The hydrophobic polymers obtained in the manner above described may be used in conventional manner to make molded or otherwise shaped plastic articles. When making copolymeric products, such as acrylamide-acrylonitrile copolymers, it is desirable to use wetting or emulsifying agents in the emulsion when effecting the polymerization.

To facilitate a fuller and more complete understanding of the subject matter of this invention and of how the process in accordance therewith best may be practiced, several specific examples herewith follow, provided, it is clearly to be understood, merely by way of illustration and not by way of limitation upon the invention as defined in the subjoined claims.

Example 1

About one part by weight of acrylamide is dissolved in approximately six parts by weight of 30% by weight sulfuric acid, to which 0.01 part by weight of ferrous sulfate has been added. About 0.01 part by weight of ammonium persulfate is added and the polymerization thereupon is performed at a controlled temperature of approximately 120° C. The polymerization product separates from the reaction mixture and is removed, washed and dried. It is a white powder, substantially insoluble in water, softening at about 130° C. and having a nitrogen content of about 8% by weight. It does not swell in water. It may be molded at elevated temperatures and pressures, to yield articles that, when exposed to moisture, absorb merely about 3% by weight of water. The yield of the polymeric product is about 70% by weight of the calculated yield.

Example 2

About one part by weight of acrylamide is dissolved in approximately six parts by weight of 20% by weight sulfuric acid, to which 0.01 part by weight of ferrous sulfate has been added. Following addition of about 0.01 part of ammonium persulfate to the reaction mixture, polymerization is performed at a temperature of approximately 80° C. and the reaction product, which separates from the reaction mixture, is recovered. After washing and drying, it is obtained as yellowish, glassy, transparent particles that swell very slightly in water, soften when heated at about 145° C. and have a nitrogen content of about 9% by weight. Articles made by hot pressure molding of this product have a hardness of 10,400 kilograms per square centimeter, measured by the cone melting point method, and, when exposed to moisture, absorb merely 9% by weight. The polymeric product is obtained in a yield of about 70% by weight of the calculated yield.

Example 3

The procedure described in Example 1 is repeated except that the acrylamide is polymerized in six parts by weight of 44% by weight sulfuric acid at 100° C., instead of 30% acid at 120° C. The polymer so obtained separates from the reaction mixture and is recovered, washed and dried. It is obtained in a yield of about 72% by weight of the calculated yield. Articles made by hot pressure molding of this polymer soften at about 85° C. and, when exposed to moisture, absorb about 12% by weight.

Example 4

The procedure of Example 1 is repeated except that the 30% by weight sulfuric acid is replaced by 6.5% by weight sulfuric acid and the polymerization is performed at about 100° C. The polymerization product, which separates from the reaction mixture, is recovered, washed and dried. It softens when heated at a temperature of about 115° C. and, when exposed to moisture, it absorbs about 24.7% by weight. It is obtained in a yield of about 89% by weight of the calculated yield. This Example illustrates the increase in the hydrophilic properties, i. e., the capacity for water absorption, that results from polymerization in a merely weakly acid reaction medium.

Example 5

About one part by weight of acrylamide is dissolved in approximately 6 parts by weight of 30% by weight orthophosphoric acid and, after the mixture has been heated to a temperature of about 100° C., a solution of 0.01 part ammonium persulfate in 0.1 part by weight of water is added thereto. As the polymerization reaction which ensues is exothermic, cooling is provided to control the temperature rise and thereafter the mixture is maintained for a period of five hours at a temperature of about 100° C. The polymerization product separates from the reaction mixture as a viscous, coherent mass, which is removed, washed with methanol and dried to yield gray granules which do not swell appreciably in water. Further small quantities of the polymerization product may be recovered from the reaction mixture by treatment with methanol. The yield is about 82% by weight of the calculated yield.

Example 6

The procedure described in Example 5 is repeated except that instead of a 30% by weight orthophosphoric acid, a 2% by weight solution of this reagent is employed. The polymerization product is obtained as a gelatinous mass which separates from the reaction mixture and is recovered, washed with methanol and dried. This product is obtained as a white, crumbly powder which swells slightly in water. It is obtained in a yield of about 90% by weight of the calculated yield.

Example 7

Acrylamide is polymerized in substantially the manner above described in a 5% by weight hydrochloric acid solution at a temperature of about 100° C. Upon cooling the reaction mixture, a polymerization product separates which is recovered, washed and dried. This product is found to have a water absorption capacity of about 36% by weight, illustrating the effect of effecting the polymerization in dilute acid media.

Example 8

A solution containing about 2% by weight of zinc chloride-hydrochloric acid complex is prepared by dissolving approximately 0.068 part by weight of zinc chloride in 0.05 part by weight of concentrated hydrochloric acid and 5.9 parts by weight of water. One part by weight of acrylamide, together with 0.04 part of ammonium persulfate, are added to the solution and polymerization is carried out at a controlled temperature of about 100° C. The substantially water-insoluble reaction product, as in the foregoing examples, separates from the reaction mixture and is recovered, washed and dried. This product swells in water to yield a soft, plastic, opaque mass. It is obtained in a yield of about 87% by weight of the calculated yield.

Example 9

Acrylamide is dissolved in a 10% by weight nitric acid solution to produce a solution containing about 14% by weight of acrylamide, then ferrous sulfate, in the proportion of 0.01 part per part by weight of acrylamide present, is added and the mixture is heated at a temperature of about 100° C. About 0.01 part by weight of ammonium persulfate, dissolved in 0.3 part by weight of water, is added, causing a mild exothermic reaction, and the mixture is heated at a temperature of about 100° C. for approximately five hours. The polymeric reaction product separates, upon cooling, as a viscid mass, which is removed, and further quantities of the product are obtained by treating the reaction mixture with methanol. After washing and drying, the product is obtained as a water-insoluble mass of mutually adherent particles which swell merely slightly in water. The product is obtained in a yield of about 55% by weight of the calculated yield.

Example 10

The procedure described in Example 9 is repeated except that the 10% by weight nitric acid solution is replaced by a 10% by weight perchloric acid solution. The polymerization product is a gelatinous mass, which is precipitated with methanol, washed and dried. It is insoluble in water and swells merely slightly therein: the particles tend to stick together to form an opaque, plastic mass.

Example 11

One part by weight of acrylamide is dissolved in about six parts by weight of 30% by weight perchloric acid and the solution is heated to a temperature of about 60° C. About 0.01 part of ammonium persulfate, dissolved in 0.3 part by weight of water, is added and the mixture is maintained at a temperature of about 60° C. for a period of approximately five hours. After cooling the reaction mixture, the polymerization product is caused to separate by addition of methanol, then the recovered product is washed and dried. It is obtained as a crumbly, gray powder that swells merely slightly in water and which, when molded in the usual manner, yields an article which softens when heated at a temperature of about 90° C. and, when in the presence of moisture, which absorbs about 28% by weight. The polymerization product is obtained in a yield of about 77% by weight of the calculated yield. This example illustrates the effect of performing the polymerization reaction at low temperatures, whereby the product obtained is not truly hydrophobic as this term is employed herein.

Example 12

About one part by weight of acrylamide and 0.01 part by weight of ferrous sulfate are dissolved in six parts by weight of an aqueous solution containing 30% by weight of toluene sulfonic acid, and 0.01 part of ammonium persulfate is added, then the mixture is heated at 60° C. An exothermic polymerization reaction ensues, after which the mixture is maintained at a temperature of about 100° C. for a period of approximately one hour. After cooling the reaction mixture, a portion of the polymerization product separates and further quantities are caused to separate by addition of water to the mixture. The separated product is washed and dried, yielding yellow granular particles having a nitrogen content of about 8% by weight and which do not swell in water. When molded in conventional manner, this product yields articles that soften at about 170° C. and, when in the presence of moisture, absorb merely 4.9% by weight. The yield of the polymerization product is about 33% by weight of the calculated yield.

Example 13

About one part by weight of acrylamide and approximately 0.01 part by weight of ferrous sulfate are dissolved in six parts by weight of 30% by weight sulfuric acid and, at a temperature of approximately 20° C., about 0.44 part by weight of acrylonitrile and 0.01 part by weight of ammonium persulfate dissolved in 0.1 part by weight of water are added. An exothermic reaction ensues, causing the temperature of the reaction mixture to rise to about 40° C., and the polymerization product separates from the reaction mixture as white flakes, which are removed, washed and dried. The product so obtained is in the form of white, crumbly, granular particles, having a nitrogen content of about 15.1%, which soften when heated at a temperature of about 140° C. and which do not swell in water. This polymerization product is obtained in a yield of about 85% by weight of the calculated yield. When molded in conventional manner, this product yields articles having a water-absorption capacity of about 5% by weight. If, in the procedure above described, the sulfuric acid solution is replaced by a dilute acetic acid solution, the copolymerizate so produced, when molded, yields articles having a water-absorption capacity of about 12% by weight.

Example 14

About one part by weight of acrylamide and 0.01 part by weight of ferrous sulfate are dissolved in six parts by weight of 44% by weight sulfuric acid and 0.43 part by weight of acrylonitrile is added to the mixture, then the mixture is heated at a temperature of about 60° C. Approximately 0.01 part by weight of ammonium persulfate, dissolved in 0.8 part by weight of water, is added to the reaction mixture and the exothermic reaction which ensues lasts about one hour. Careful temperature control is maintained whereby the reaction mixture, about 25 minutes after the exothermic reaction is terminated, is heated at a temperature of about 100° C., which is maintained for about one hour thereafter. The reaction product separates as a viscous, adherent mass which is removed, washed and dried. This product is obtained as a crumbly, gray-white powder which does not swell in water, which softens at about 115° C., and which, upon exposure to moisture, absorbs about 3% by weight. The polymerization product is obtained in a yield of about 77% by weight of the calculated yield.

Example 15

The procedure described in Example 14 is repeated except that equal parts by weight of acrylamide and acrylonitrile are polymerized in the manner described. The polymerization product so obtained, which is not visibly affected by water, may be molded in conventional manner to yield articles that soften when heated at 115° C. and which, upon exposure to moisture, absorb about 3.7% by weight. The yield of the polymerization product is about 76% by weight, based on the calculated yield.

What is claimed is:

1. Process for the production of water-insoluble polymers containing acrylamide, which comprises polymerizing acrylamide in a strongly acid aqueous medium of the group consisting of (a) an at least 10% by weight aqueous solution of an acid of the group consisting of sulfuric acid, phosphoric acid, nitric acid and perchloric acid, (b) an at least 5% by weight aqueous solution of hydrochloric acid, (c) an at least 30% by weight aqueous solution of an organic sulfonic acid, and (d) an at least 2% by weight aqueous solution of zinc chloride-hydrochloric acid complex, said polymerization being carried out at a temperature 60 to 120° C.

2. Process in accordance with claim 1 wherein the strongly acid aqueous medium contains a polymerization-initiating redox system.

3. Process as defined in claim 2 wherein the polymerization-initiating redox system is a combination of a salt of a metal of the third to eighth groups of the periodic system capable of furnishing ions of said metal in a state of less than maximum valency, with an oxygen-rich reagent.

4. Process as defined in claim 3 wherein the salt is ferrous sulfate and the oxygen-rich reagent is ammonium persulfate.

5. Process for the production of water-insoluble copolymers containing acrylamide, which comprises copolymerizing a mixture of acrylamide and acrylonitrile in a strongly acid aqueous medium of the group consisting of (a) an at least 10% by weight aqueous solution of an acid of the group consisting of sulfuric acid, phosphoric acid, nitric acid and perchloric acid, (b) an at least 5% by weight aqueous solution of hydrochloric acid, (c) an at least 30% by weight aqueous solution of an organic sulfonic acid, and (d) an at least 2% by weight aqueous solution of zinc chloride-hydrochloric acid complex, said polymerization being carried out at a temperature 60 to 120° C.

6. Process in accordance with claim 5 wherein the strongly acid aqueous medium contains a polymerization-initiating redox system.

7. Process in accordance with claim 6 wherein the polymerization-initiating redox system is a combination of a salt of a metal of the third to eighth groups of the periodic system capable of furnishing ions of said metal in a state of less than maximum valency, with an oxygen-rich reagent.

8. Process in accordance with claim 7 wherein the salt is ferrous sulfate and the oxygen-rich reagent is ammonium persulfate.

References Cited in the file of this patent

UNITED STATES PATENTS 2,486,190     Minsk et al.     Oct. 25, 1949

FOREIGN PATENTS 599,472     Great Britain     Mar. 12, 1948